(12) United States Patent
Bierhuizen et al.

(10) Patent No.: US 8,755,005 B2
(45) Date of Patent: Jun. 17, 2014

(54) THIN EDGE BACKLIGHT WITH LEDS OPTICALLY COUPLED TO THE BACK SURFACE

(75) Inventors: Serge J. Bierhuizen, Santa Rosa, CA (US); Gregory W. Eng, Freemont, CA (US)

(73) Assignees: Koninklijke Philips N.V., Eindhoven (NL); Philips Limileds Lighting Company, LLC, San Jose, CA (US)

( * ) Notice: Subject to any disclaimer, the term of this patent is extended or adjusted under 35 U.S.C. 154(b) by 1379 days.

(21) Appl. No.: 12/236,542

(22) Filed: Sep. 24, 2008

(65) Prior Publication Data

US 2010/0073597 A1 Mar. 25, 2010

(51) Int. Cl.
G02F 1/1335 (2006.01)
B60Q 1/12 (2006.01)
F21V 7/04 (2006.01)

(52) U.S. Cl.
USPC .................. 349/65; 349/62; 362/60; 362/615

(58) Field of Classification Search
USPC .................................. 349/62, 65; 362/60, 615
See application file for complete search history.

(56) References Cited

U.S. PATENT DOCUMENTS 4,059,916 A * 11/1977 Tachihara et al. ............... 40/448
7,424,197 B2 9/2008 Winston et al.
2005/0140912 A1* 6/2005 Hirakata et al. ............... 349/153
2006/0043391 A1* 3/2006 Erchak et al. .................... 257/82
2006/0232996 A1* 10/2006 Kim et al. ...................... 362/615
2007/0138494 A1* 6/2007 Pugh et al. ........................ 257/98
2007/0215890 A1 9/2007 Harbers et al.
2007/0284600 A1 12/2007 Shchekin et al.
2008/0137004 A1* 6/2008 Iwasaki et al. ................... 349/64
2008/0198300 A1* 8/2008 Okumura et al. ............... 349/68
2008/0204623 A1* 8/2008 Tanaka ............................. 349/58
2009/0059579 A1* 3/2009 Shin et al. ...................... 362/231

FOREIGN PATENT DOCUMENTS

DE 202007017224 U1 10/2007

OTHER PUBLICATIONS

Gerard Harbers et al: "Performance of High Power Light Emitting Diodes in Display Illumination Applications" Journal of Display Technology, IEEE Service Center, New York, NY, US, vol. 3, No. 2, Jun. 1, 2007; p. 98-109, ,XP01182138; ISSN: 1551-319K.
International Search Report PCT/IB2009/054132. Attached.

* cited by examiner

Primary Examiner — Jerry Blevins (57) ABSTRACT

A backlight includes a waveguide with a plurality of light emitting diodes positioned in cavities in the back surface in a center region of the waveguide. The back surface of the waveguide can be tapered from the center region to the edges so that the edges are thinner than the center region. Additionally, with the light emitting diodes in the center region of the waveguide, as opposed to along the edges, the bezel may be eliminated or at least minimized in height, e.g., 1 mm or less. Additionally, multiple waveguides may be used and configured in a "V" shape to minimize the bezel.

18 Claims, 7 Drawing Sheets

Fig. 1A
(Conventional)

Fig. 1B
Conventional)

THIN EDGE BACKLIGHT WITH LEDS OPTICALLY COUPLED TO THE BACK SURFACE

FIELD OF THE INVENTION

The present invention is related to light emitting diodes (LEDs) and, in particular, to using LEDs with a backlight.

BACKGROUND

Liquid crystal displays (LCDs) are commonly used laptop computers, desktop monitors, television, as well as smaller applications such as in cell phones, personal digital assistants (PDAs), portable music players. Transmissive LCDs require backlighting, which is conventionally accomplished by illuminating the edge of the waveguide using a light source, such as LEDs.

Figure 1A:
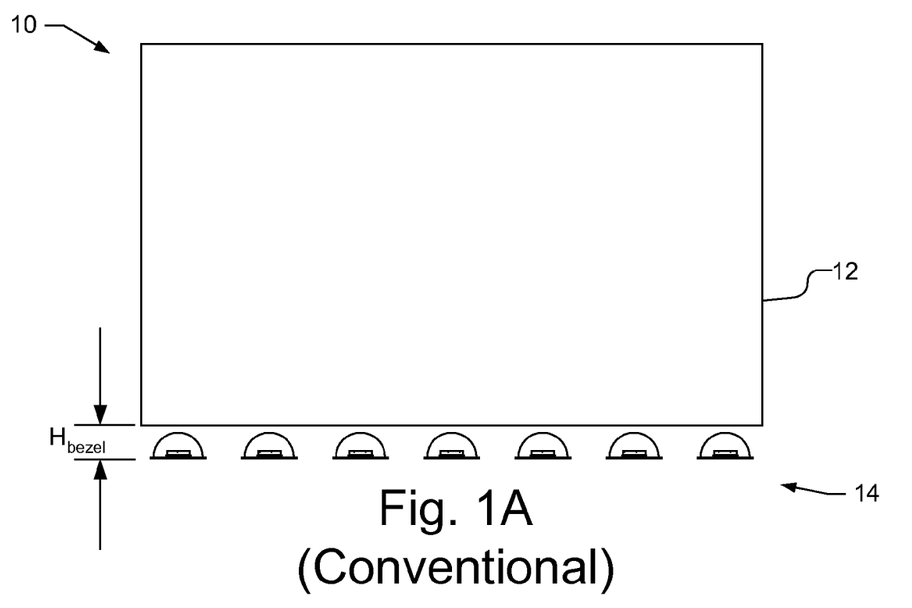
FIGS. 1A and 1B illustrate a plan view and side view, respectively, of a conventional backlight with a waveguide that is illuminated from the edge by a plurality of LEDs.
Figure 1B:
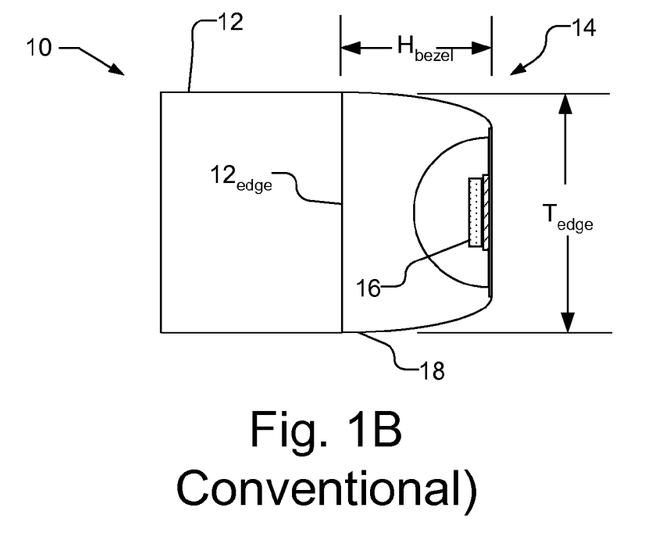

Edge-lit backlights used in computer monitors and televisions have a minimum bezel-height and edge-thickness that is driven at least partly by the size of the light source and the waveguide thickness. FIGS. 1A and 1B, by way of example, illustrate a plan view and side view, respectively, of a conventional backlight 10 that includes an edge-lit waveguide 12 that is illuminated by a plurality of LED light sources 14, which are illustrated in FIG. 1B as including an LED 16 and reflector 18. As can be seen, the bezel height $H_{bezel}$ is determined by the height of the LED light sources 14 and the thickness $T_{edge}$ of the waveguide edge $12_{edge}$ is determined by the width of the LED light sources 14. For aesthetics and design purposes, it is desirable to minimize the bezel height and edge thickness.

SUMMARY

A backlight includes a waveguide with a plurality of LEDs positioned in cavities in the back surface of the waveguide to serve as the light source. The LEDs may be low profile side emitting LEDs and may produce white light, e.g., through wavelength conversion, or blue light, with a wavelength converting element mounted to the waveguide. The back surface of the waveguide can be tapered from the location of the LEDs to the side edges so that the side edges are thinner than a central region of the waveguide, giving the waveguide a thin appearance. Additionally, because the light emitting diodes are located in the back surface of the waveguide, as opposed to being positioned along the side edges, the bezel may be eliminated or at least minimized in height, e.g., 1 mm or less.

DETAILED DESCRIPTION

Figure 2A:
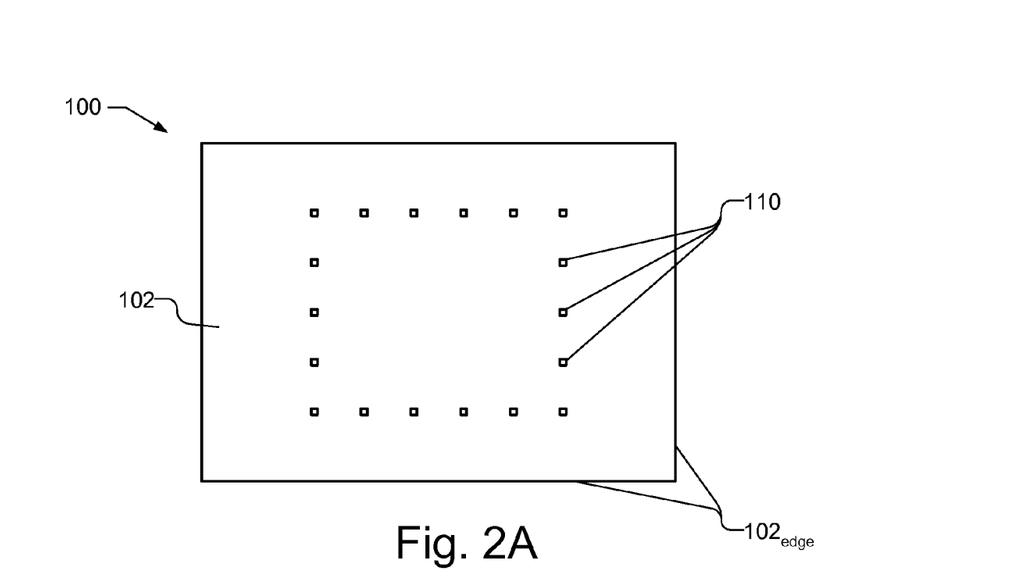
FIGS. 2A and 2B illustrates a top plan view and side view, respectively, of a backlight including a waveguide with LEDs distributed in the back surface of the waveguide.
Figure 2B:
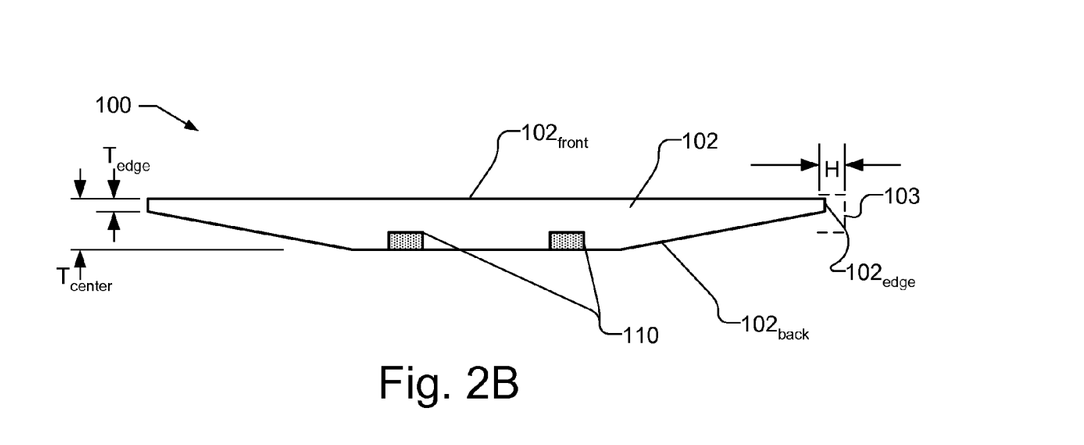

FIGS. 2A and 2B illustrates a top plan view and side view, respectively, of a backlight 100 including a waveguide 102 with low profile side emitting LEDs 110 distributed in the back of the waveguide 102. With the use of LEDs 110 distributed in the back of the waveguide 102, the bezel height is minimized. For example, the bezel may be completely eliminated as the LEDs 110 are not at the edge $102_{edge}$ of the waveguide 102, but for protection of the display, including waveguide 102 and the overlying LCD (not illustrated in FIGS. 2A and 2B), a bezel 103 with a low height H, e.g., 1 mm, may be used as illustrated by the broken lines in FIG. 2B. Additionally, as illustrated in FIG. 2B, the back surface $102_{back}$ of the waveguide 102 may be tapered towards the front surface $102_{front}$ to minimize the thickness of the edge $102_{edge}$ of the waveguide 102. It should be understood that instead of side emitting LEDs 110, top emitting LEDs with attached or external side directing optical elements may be used.

The LEDs 110 may be arranged in the waveguide 102 in rows (columns) or in a rectangle, as illustrated in FIG. 2A. The LEDs 110 are positioned in a center region of the waveguide that is between the side edges $102_{edge}$. By way of example, the distance between the LEDs 110 and the nearest edge $102_{edge}$ along with width of the waveguide 102 may be approximately 25% to 33% of the edge-to-edge width. Alternatively, the LEDs 110 may be positioned within the back of the waveguide 102 in a checkerboard, or other spatially distributed fashion. The emission of the relatively small LEDs can be covered or suppressed sufficiently to avoid hot spots in the backlight. Additionally, with the higher mixing height in the backlight, the light will be mixed by the time is incident on a diffuser or remote phosphor plate or exits the backlight. Diffuser films, Brightness Enhancement Films and remote wavelength converting material, such as phosphor films, can generate additional recycling and mixing of the light that will improve uniformity. If that is not sufficient, a patterned diffuser may be used to optimally control the light distribution uniformly through the LCD. With the LEDs 110 positioned in the center region and the back surface $102_{back}$ tapered, the center region has a thickness $T_{center}$ while the edges have smaller thickness $T_{edge}$. In one embodiment, the edge thickness $T_{edge}$ is less than half of the center region thickness $T_{center}$, and in another embodiment, the edge thickness $T_{edge}$ may be zero or approximately zero within the constraints of manufacturing.

Figure 3A:
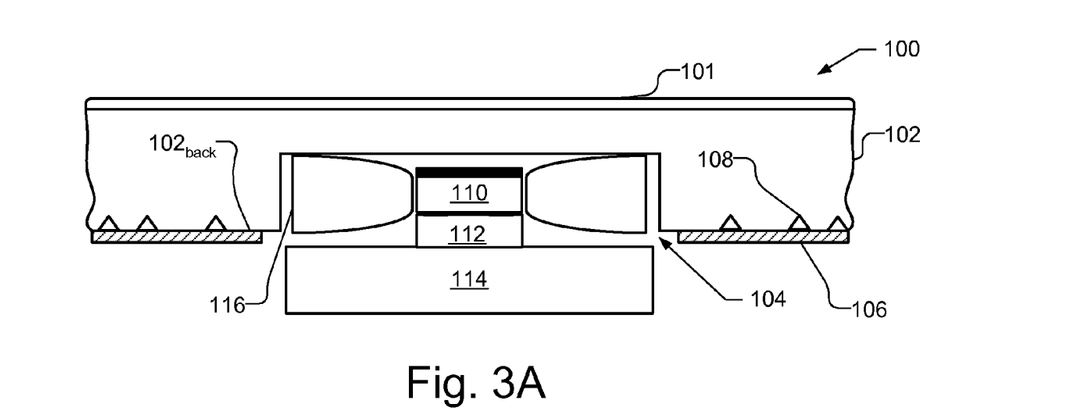
FIGS. 3A, 3B, 3C, 3D, and 3E illustrate cross-sectional views of a portion of a backlight with an overlying LCD and an LED mounted in a cavity in the back surface of the backlight.

FIG. 3A illustrates a cross-sectional view of a portion of a backlight 100 with an overlying LCD 101 cut across an LED 110. In FIG. 3A, the side-emitting LED 110 is mounted on submount 112 and a circuit board 114 and includes an overmolded lens 116. The LED 110 with the overmolded lens 116 is inserted into a cavity 104 in the solid transparent waveguide 102. There may be a small air gap, such as 25 microns, between the lens 116 and the walls of the cavity 104 to accommodate positioning tolerances. The air gap may be larger with some embodiments of the LEDs, e.g., top emitting LEDs with a side directing optical elements. The waveguide 102 may be a hollow cavity, molded plastic (e.g., PMMA) or another suitable material. A mirror film 106 may cover the back surface $102_{back}$ and edges $102_{edge}$ of the waveguide 102 (shown in FIGS. 2A and 2B). The film 106 may be Enhanced Specular Reflector (ESR) film available from 3M Corporation or an external diffuse white scattering plate. It is optional that the mirror film 106 or the external white plate cover the edges $102_{edge}$. Instead of using a reflective film, the waveguide 102 may be supported in a carrier with reflective side walls.

The back surface $102_{back}$ of the waveguide 102 may have many small pits 108 for scattering the light in an upward direction toward the back surface of the LCD 101. The LCD 101 selectively controls pixels in a display screen in a conventional manner. The pits 108 may be created in the molding process for the waveguide 102 or may be formed by etching, sand blasting, printing, or other means. Alternatively, extraction features may be formed by printing white scattering dots. The pits 108 may take any form such as prisms or a random roughening. Such features are sometimes referred to as extraction features. In one embodiment, the density of the pits 108 nearer the LEDs 110 (where the light from the LED is brighter) is less than the density of the pits 108 farther from the LED 110 to create a uniform light emission over the front surface $102_{front}$ of the waveguide 102. For more information about the backlight and waveguide see U.S. Ser. No. 11/840,130, entitled "Thin Backlight Using Low Profile Side Emitting LED", by Serge Bierhuizen et al., Aug. 16, 2007, which is incorporated by reference in their entirety. A remote phosphor film can add additional mixing in the backlight if desired.

Figure 3B:
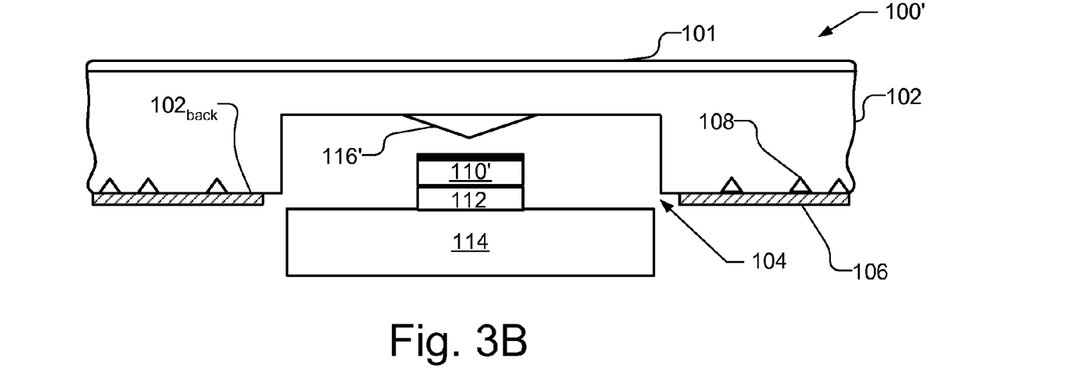
Figure 3C:
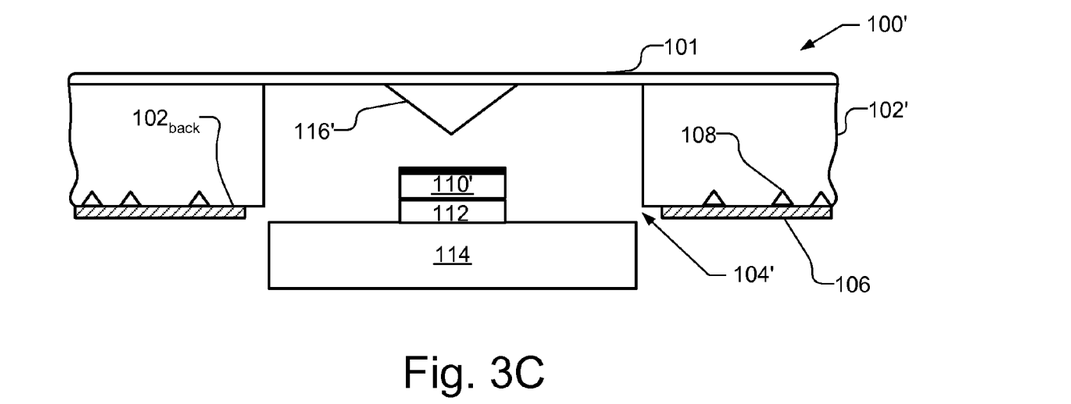
Figure 3D:
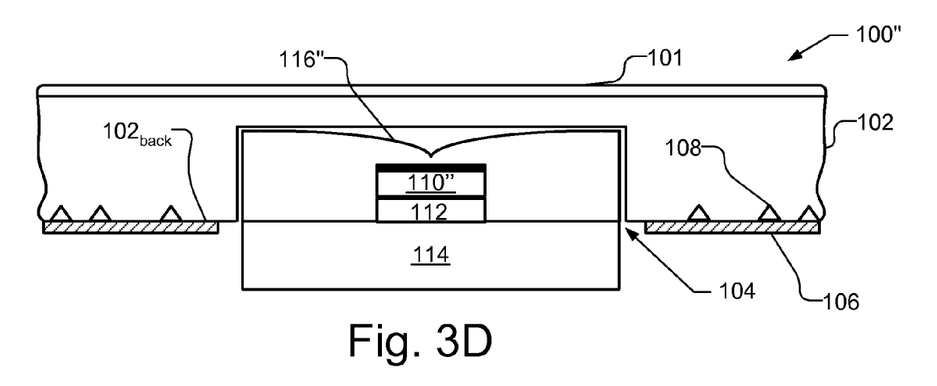
Figure 3E:
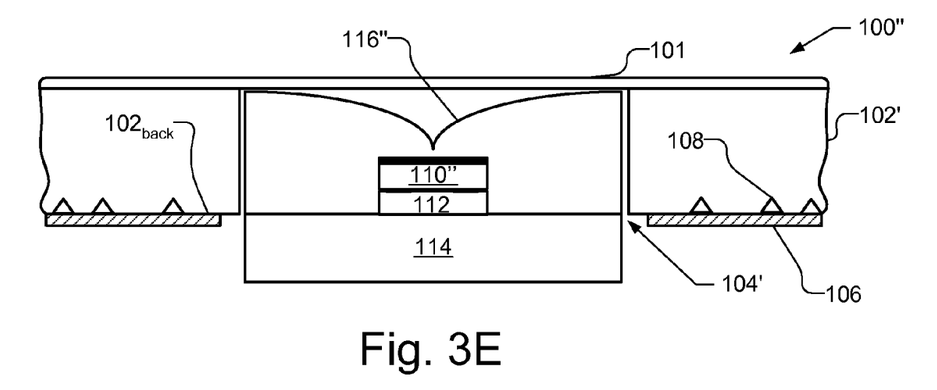

FIGS. 3B, 3C, 3D, and 3E illustrate cross-sectional views of other embodiments of backlights and LEDs. FIG. 3B illustrates the use of top emitting LED 110' with a top reflector 116' coupled to the waveguide 102 for re-directing the top emitted light from LED 110' into the waveguide 102. FIG. 3C is similar to FIG. 3B, however, the cavity 104' in the waveguide 102' in FIG. 3C is a through-hole extending from the bottom surface to the top surface. FIG. 3D illustrates the use of an overmolded lens 116" for re-directing the top emitted light from LED 110" into the waveguide 102. FIG. 3E is similar to FIG. 3D, with the cavity 104' in the form of a through-hole extending from the bottom surface to the top surface.

Figure 4:
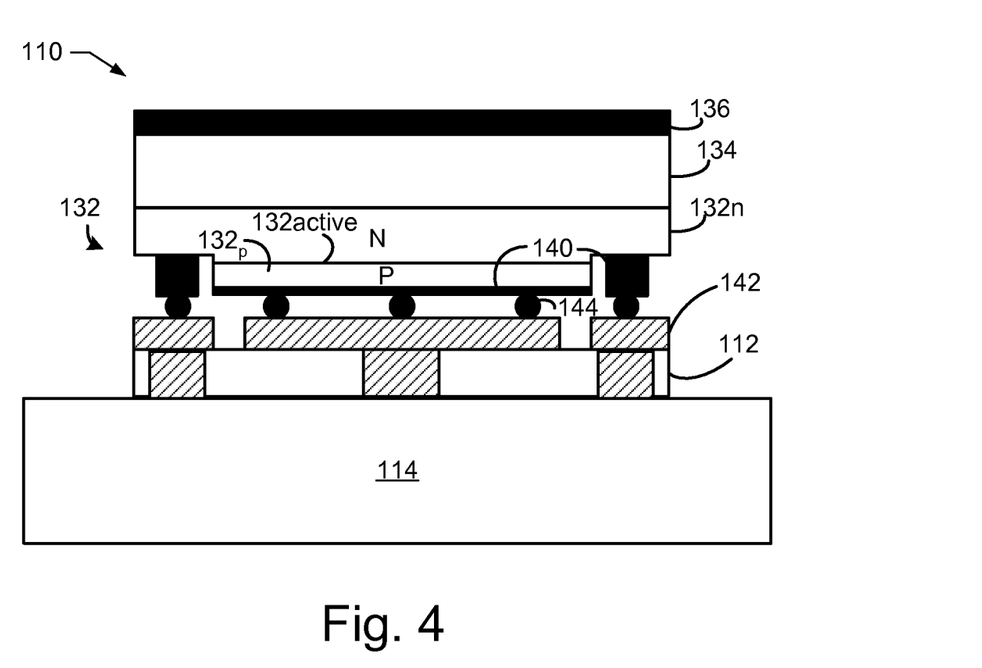
FIG. 4 is a cross-sectional view of one embodiment of a low profile side-emitting LED that may be used with the backlight.

FIG. 4 is a cross-sectional view of one embodiment of a low profile side-emitting LED 110 that may be used with the backlight 100. The LED 110 includes a semiconductor light emitting element 132, a wavelength converting element 134, and a reflective film 136. The side emitting LED 110 is mounted on a submount 112, which is mounted on a printed circuit board 114. Other embodiments of thin, side-emitting LEDs that may be used in the backlight embodiments can be found in U.S. application Ser. No. 11/423,419, entitled Low Profile Side Emitting LED, filed Jun. 9, 2006, by Oleg Shchekin et al., assigned to the present assignee, and incorporated herein by reference.

The active layer of the LED 110 in one example generates blue light. The LED 110 is formed on a starting growth substrate, such as sapphire, SiC, or GaN. Generally, an n-layer $132_n$ is grown followed by an active layer $132_{active}$, followed by a p-layer $132_p$. The p-layer $132_p$ is etched to expose a portion of the underlying n-layer $132_n$. Reflective metal electrodes 140 (e.g., silver, aluminum, or an alloy) are then formed over the surface of the LED to contact the n and p layers. When the diode is forward biased, the active layer $132_{active}$ emits light whose wavelength is determined by the composition of the active layer (e.g., AlInGaN). Forming such LEDs is well known and need not be described in further detail. Additional detail of forming LEDs is described in U.S. Pat. No. 6,828,596 to Steigerwald et al. and U.S. Pat. No. 6,876,008 to Bhat et al., both assigned to the present assignee and incorporated herein by reference.

The semiconductor light emitting element 132 is then mounted on a submount 112 as a flip chip. The submount 112 contains metal electrodes 142 that are soldered or ultrasonically welded to the metal 140 via solder balls 144. Other types of bonding can also be used. The solder balls 144 may be deleted if the electrodes themselves can be ultrasonically welded together.

The submount electrodes 142 are electrically connected by vias to pads on the bottom of the submount 112 so the submount 112 can be surface mounted to metal pads on a printed circuit board 114. Metal traces on the circuit board 114 electrically coupled the pads to a power supply. The submount 112 may be formed of any suitable material, such as alumina nitride, ceramic, silicon, alumina, etc. If the submount material is conductive, an insulating layer is formed over the substrate material, and the metal electrode pattern is formed over the insulating layer. The submount 112 acts as a mechanical support, provides an electrical interface between the delicate n and p electrodes on the LED chip and a power supply, and provides heat sinking. Submounts are well known. Processing of the LED semiconductor layers may occur before or after the LED is mounted on the submount 112.

To cause the LED 110 to have a very low profile, and to prevent light from being absorbed by the growth substrate, the growth substrate is removed, such as by CMP or using a laser lift-off method, where a laser heats the interface of the GaN and growth substrate to create a high-pressure gas that pushes the substrate away from the GaN. In one embodiment, removal of the growth substrate is performed after an array of LEDs is mounted on a submount wafer and prior to the LEDs/submounts being singulated (e.g., by sawing).

After the growth substrate is removed and the emitting surface is roughened, a wavelength converting element 134, such as planar phosphor layer 134 is positioned over the top of the LED for wavelength-converting the blue light emitted from the active layer $132_{active}$. Alternatively, the element 134 may be a transparent element, such as glass, that may be positioned over the top of the LED when a blue-side emitter is desired. The phosphor layer 134 may be preformed as a ceramic sheet and affixed to the LED layers, or the phosphor particles may be thin-film deposited, such as by electrophoresis. The phosphor ceramic sheet may be sintered phosphor particles or phosphor particles in a transparent or translucent binder, which may be organic or inorganic. The light emitted by the phosphor layer 134, when mixed with blue light, creates white light or another desired color. The phosphor may be an yttrium aluminum oxide garnet (YAG) phosphor that produces yellow light (Y+B=white), or may be a combination of a red phosphor and a green phosphor (R+G+B=white).

With a YAG phosphor (i.e., Ce:YAG), the color temperature of the white light depends largely on the Ce doping in the phosphor as well as the thickness of the phosphor layer 134.

A reflective film 136 is then formed over the transparent or phosphor layer 134. The reflective film 136 is substantially parallel with the top surface of the semiconductor light emitting element 132. The reflective film 136 may be specular or diffusing. A specular reflector may be a distributed Bragg reflector (DBR) formed of organic or inorganic layers. The specular reflector may also be a layer of aluminum or other reflective metal, or a combination of DBR and metal. A diffusing reflector may be formed of a metal deposited on a roughened surface or a diffusing material such as a suitable white paint or a sol-gel solution with TiO2 in, e.g., silicone, solgel or silres. The phosphor layer 134 also helps to diffuse the light to improve light extraction efficiency. In another embodiment, the reflector 136 is spaced away from the LED, such as a reflector supported by the waveguide 102 in the cavity 104 over the active layer, resulting in the LED still being a side-emitting LED since little (e.g., up to 10%) direct light exits the backlight above the LED. In addition, blue LEDs can be used in combination with a remote phosphor layer elsewhere in the backlight.

Most light emitted by the active layer $132_{active}$ is either directly emitted through the sides of the LED, or emitted through the sides after one or more internal reflections. If the top reflector 136 is very thin, some light may leak through the top reflector 136.

In one embodiment, the submount 112 has a thickness of about 380 microns, the semiconductor layers have a combined thickness of about 5 microns, the phosphor layer 134 has a thickness of about 200 microns, and the reflective film 136 has a thickness of about 150 microns, so that the LED plus the submount is less than 1 mm thick. Of course, the LED 110 can be made thicker. The length of each side of the LED is typically less than 1 mm, for example, the length of a side may be 0.6 mm, however, a side length of 1.0 mm may be used, e.g., for higher power applications. Greater heights may be used in case of other side emitting configuration, such as overmolded optics on top emitters or external optical components for side re-direction.

Figure 5A:
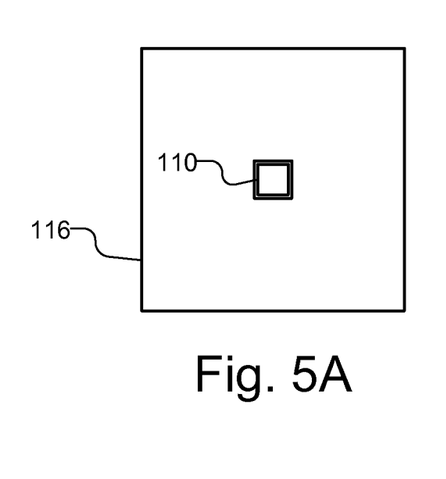
FIGS. 5A and 5B illustrate top plan views of different configurations of a collimating lens that may be used with the backlight.
Figure 5B:
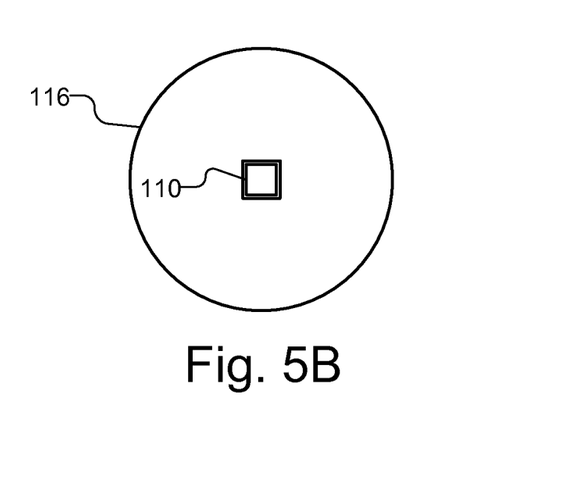

The overmolded lens 116, shown in FIG. 3A, is a collimating optic coupled to the LED 110 that collimates the side emitted light in the horizontal plane. The lens 116 may have different configurations, as illustrated in FIGS. 5A and 5B which illustrate top plan views of a square and circular configuration of the lens 116 with the LED 110. If desired, different configurations of the lens 116 may be used at different locations within the backlight 100. As can be seen, the lens 116 is coupled to each light emitting side of the LED 110, and thus, in the present embodiment where the LED 110 has four light emitting sides, the lens 116 includes four entrance surfaces coupled to each side. If desired, separate individual lenses may be combined to form a single lens 116. Additionally, different configurations of lenses may be used with top emitting LEDs.

Figure 6:
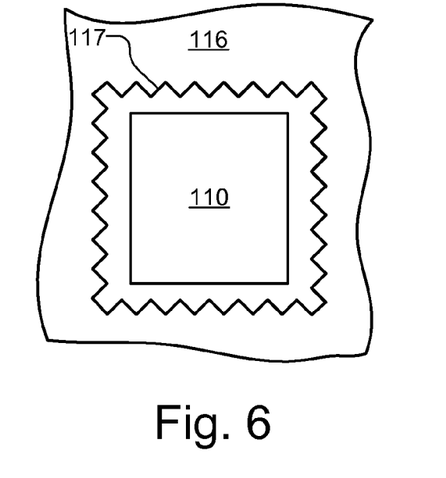
FIG. 6 illustrates a top plan view of the LED with a portion of the collimating lens.

FIG. 6 illustrates a top plan view of the LED 110 with a portion of the lens 116, wherein the entrance surface of the lens 116 have vertically oriented angled walls 117, which may also be used to improve the angular mixing of the light within the lens 116. The varying angles of the walls 117 of the entrance surface of the lens 116 refract the light emitted by the LED 110 at different angles so the light is spread more evenly. Because the light is being collimated in the horizontal plane, there is no need to produce horizontally oriented angled walls. While FIG. 6 illustrates walls 117 with a saw-tooth configuration, other configurations may be used, such as rounded or scallop shapes. The shape of the sidewalls may also be varied based on the distribution of the extraction features formed on the bottom surface of the waveguide to achieve the most uniform brightness profile at the light output of the backlight.

Figure 7:
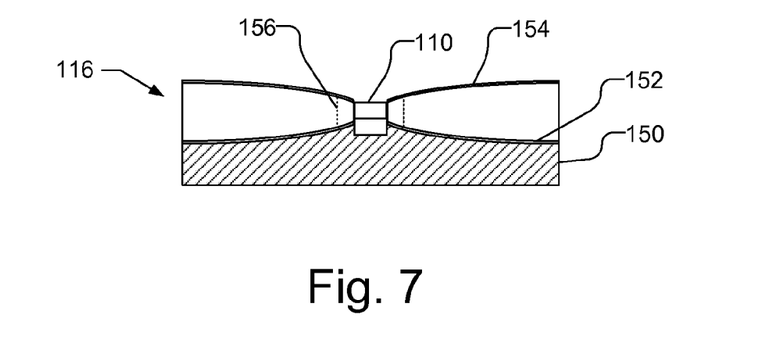
FIG. 7 illustrates an LED with an overmolded lens formed on a molded lead frame.

The lens 116 may be produced by overmolding and in one embodiment, a molded lead frame is used to form the bottom of the lens 116. FIG. 7 illustrates an LED 110 with an overmolded lens 116 formed on a molded lead frame 150. The molded lead frame 150 may be produced from a patterned conductor material with a plastic or other appropriate material injection molded around the conductor material. The injection molded material is molded to form the bottom surface of the lens 116 and may be coated with a reflective layer 152, such as aluminum or silver. The LED 110 can then be mounted on the lead frame 150 and silicone or other appropriate material is deposited and molded to form the lens 116. A reflective layer 154, e.g., aluminum or silver, can then be deposited over the top surface of the lens 116. No reflective coating is necessary or used if the lens 116 design is based on total internal reflection within the lens material. In one embodiment, a double overmolding process may be used, in which a first material (illustrated with broken lines 156) with a first refractive index, e.g., 1.6, is deposited and molded. Additional material, with a different refractive index, e.g., 1.3, is then deposited and molded to form the remainder of the lens 116. By way of example, both the first material and the second material may be silicone with different refractive indices. The refractive indices may be selected so that desired refraction occurs at the index step to achieve angular mixing of the light. Moreover, features, such as those shown in FIG. 6 may be molded in the first silicon material 156 to help achieve the desired angular mixing of light.

Low profile side emitting LEDs with overmolded lenses are described in U.S. application Ser. No. 11/840,129, entitled "Optical Element Coupled to Low Profile Side Emitting LED" by Serge J. Bierhuizen, filed Aug. 16, 2007, which is co-owned with the present disclosure and which is incorporated herein by reference in its entirety.

Figure 8:
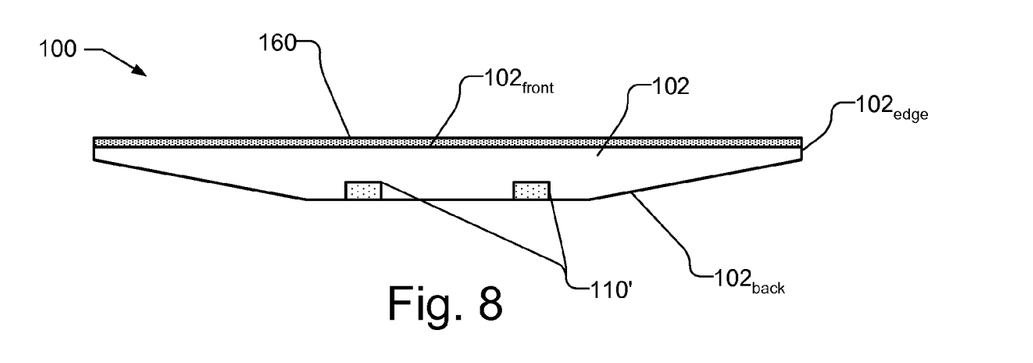
FIG. 8 illustrates a backlight including a waveguide with LEDs distributed in the back surface of the waveguide with a wavelength converting element mounted on the front surface of the waveguide.

If desired, a wavelength converting element 160 may be positioned on the front surface $102_{front}$ of the waveguide, as illustrated in FIG. 8. In such an embodiment, the LED 110', which may be a top emitter or side emitter, does not include a wavelength converting element, but instead produces blue light that is converted by the wavelength converting element 160 as the light exits the waveguide 102.

Figure 9A:
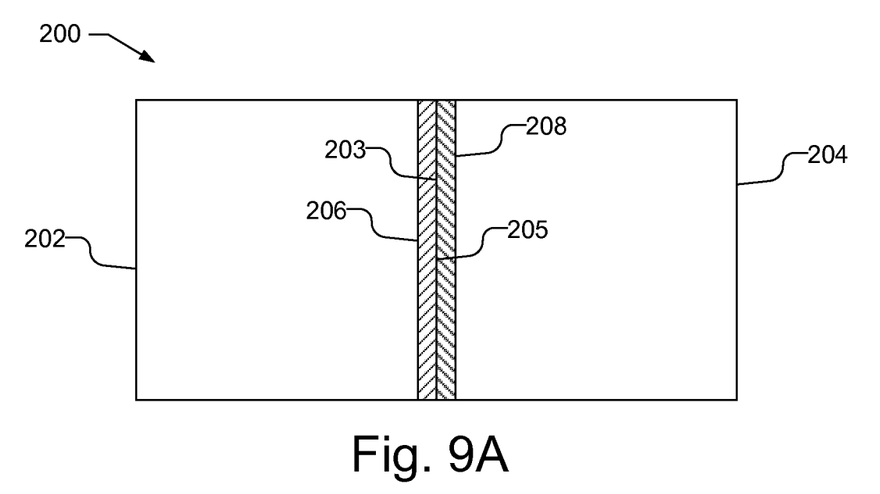
FIGS. 9A and 9B illustrate another embodiment of a waveguide.
Figure 9B:
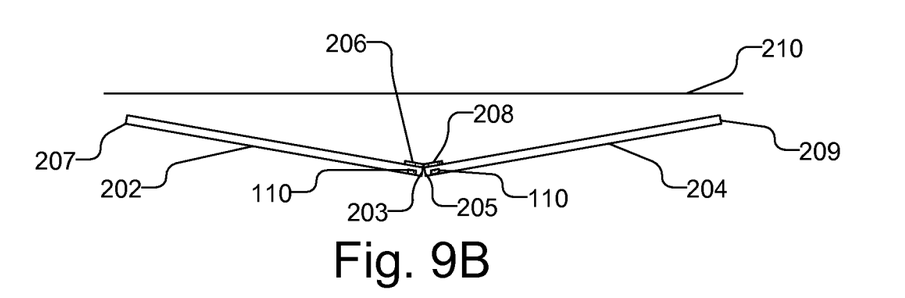

FIGS. 9A and 9B illustrate a top view and a side view of another embodiment of a waveguide 200. As illustrated in FIG. 9A, two thin waveguides 202 and 204 are used with LEDs 110 (shown in FIG. 9B) and mirrors 206 208 along one edge 203 and 205, respectively. The LEDs 110 are distributed behind the backlight as illustrated in, e.g., FIG. 3A, 3B, or 3C and do not extend into any bezel region, e.g., between the waveguides 202 and 204. The edges 203 and 205 of the waveguides 202 and 204 are positioned adjacent each other. As illustrated in FIG. 9B, the two waveguides 202 and 204 are configured in a "V" shape so that the adjacent edges 203 and 205 are farther from the LCD screen 210 then the outside edges 207 and 209, to produce an LCD screen 210 with little or no bezel.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:
1. An apparatus comprising:
   a plurality of light emitting diodes; and
   a waveguide configured to be a backlight for a display, the waveguide having a front surface from which light is emitted from the waveguide, a back surface that is opposite the front surface, four side edges between the front surface and the back surface, and a center region between the four side edges, the back surface comprising a flat portion at the center region and four inclined portions that taper from the flat portion to the four side edges, the center region having a first thickness between opposing areas of the front surface and the back surface, the four side edges having a second thickness less than the first thickness, the waveguide having a plurality of cavities in the back surface at the center region into which the plurality of light emitting diodes are inserted and optically coupled to the waveguide to serve as a light source for the waveguide, the back surface comprising pits to direct light upward and provide a uniform light emission over the front surface.

2. The apparatus of claim 1, wherein the second thickness is less than half of the first thickness.

3. The apparatus of claim 1, wherein the second thickness is zero.

4. The apparatus of claim 1, wherein there is no bezel on the side edges of the waveguide.

5. The apparatus of claim 1, further comprising a bezel on the side edges of the waveguide, and wherein there is no light source between the bezel and the side edges.

6. The apparatus of claim 1, wherein each of the plurality of light emitting diodes comprises a wavelength converting element.

7. The apparatus of claim 1, further comprising a wavelength converting element mounted to the waveguide.

8. The apparatus of claim 7, wherein the wavelength converting element is mounted to the front surface of the waveguide.

9. The apparatus of claim 1, further comprising an LCD optically coupled to the front surface of the waveguide.

10. The apparatus of claim 1, wherein the waveguide has a width from opposite side edges and wherein the plurality of light emitting diodes are positioned at a distance of 25% of the width or more from the nearest of the opposite side edges.

11. The apparatus of claim 1, wherein the plurality of light emitting diodes is positioned in a plurality of rows into the back surface at the center region of the waveguide.

12. The apparatus of claim 1, wherein the plurality of light emitting diodes are side emitting diodes.

13. The apparatus of claim 1, wherein the plurality of light emitting diodes are top emitting diodes.

14. The apparatus of claim 1, further comprising a bezel on the four side edges of the waveguide, the bezel having a height of less than 1 mm.

15. The apparatus of claim 1, wherein the plurality of light emitting diodes is spaced along a rectangle perimeter into the back surface at the center region of the waveguide.

16. An apparatus comprising:
a first plurality of light emitting diodes; and
a first waveguide configured to be a backlight for a display, the first waveguide having a front surface from which light is emitted from the first waveguide, a back surface that is opposite and parallel to the front surface, and inner and outer side edges between the front surface and the back surface, the first waveguide having a plurality of cavities in the back surface into which the first plurality of light emitting diodes are inserted and optically coupled to the first waveguide to serve as a light source for the first waveguide;
a second plurality of light emitting diodes;
a second waveguide configured to be a backlight for the display, the second waveguide having a front surface from which light is emitted from the second waveguide, a back surface that is opposite and parallel to the front surface, and inner and outer side edges between the front surface and the back surface, the second waveguide having a plurality of cavities in the back surface into which the second plurality of light emitting diodes are inserted and optically coupled to the second waveguide to serve as a light source for the second waveguide;
a screen;
wherein:
the first waveguide and the second waveguide are positioned with the inner side edges of the first and the second waveguides being adjacent to each other and the outer side edges of the first and the second waveguides being apart from each other; and
the first waveguide and the second waveguide are angled to have a "V" shape with the inner side edges of the first and the second waveguides being farther from the screen than the outer side edges of the first and the second waveguides.

17. The apparatus of claim 16, wherein the plurality of cavities in the back surface of the first waveguide into which the first plurality of light emitting diodes are inserted is along the first side edge of the first waveguide and the plurality of cavities in the back surface of the second waveguide into which the second plurality of light emitting diodes are inserted is along the first side edge of the second waveguide.

18. The apparatus of claim 16, wherein the screen comprises an LCD screen.

* * * * *